US010642083B1

United States Patent
Hwang et al.

(10) Patent No.: US 10,642,083 B1
(45) Date of Patent: May 5, 2020

(54) PREDICTIVE TEMPERATURE COMPENSATION

(71) Applicant: Apple Inc., Cupertino, CA (US)

(72) Inventors: Injae Hwang, Minato-ku (JP); Rui Zhang, Sunnyvale, CA (US); Hung Sheng Lin, San Jose, CA (US); Hyunsoo Kim, Stanford, CA (US); Hyunwoo Nho, Stanford, CA (US); Jesse A. Richmond, San Francisco, CA (US); Jie Won Ryu, Campbell, CA (US); Junhua Tan, Santa Clara, CA (US); Kingsuk Brahma, Mountain View, CA (US); Shengkui Gao, San Jose, CA (US); Shiping Shen, Cupertino, CA (US); Sun-Il Chang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 19 days.

(21) Appl. No.: 16/008,980

(22) Filed: Jun. 14, 2018

Related U.S. Application Data

(63) Continuation of application No. 15/712,460, filed on Sep. 22, 2017, now abandoned.

(60) Provisional application No. 62/511,818, filed on May 26, 2017.

(51) Int. Cl.
*G09G 3/3258* (2016.01)
*G09G 3/36* (2006.01)
*G02F 1/1333* (2006.01)

(52) U.S. Cl.
CPC ..... *G02F 1/133382* (2013.01); *G09G 3/3258* (2013.01); *G09G 3/3696* (2013.01); *G09G 2320/041* (2013.01)

(58) Field of Classification Search
CPC .............. G09G 3/3258; G09G 3/3696; G09G 2320/041
See application file for complete search history.

(56) References Cited

U.S. PATENT DOCUMENTS

2012/0139955 A1* 6/2012 Jaffari ................. G06F 17/5018
345/690
2015/0154910 A1* 6/2015 Okuno ................. G09G 3/3258
345/212

\* cited by examiner

*Primary Examiner* — Michael Pervan
(74) *Attorney, Agent, or Firm* — Fletcher Yoder, P.C.

(57) ABSTRACT

Electronic devices and methods for compensating for temperature-dependent fluctuations in a display include receiving a temperature index may be received from a sensor and/or calculations that indicates a temperature of the system, a pixel, a panel, a grid of a panel, or a combination thereof. The temperature is used to predict a voltage change across an emissive element ($V_{HILO}$), such as an organic light emitting diode (OLED). This predicted voltage change is then compensated for before emission.

19 Claims, 16 Drawing Sheets

PREDICTIVE TEMPERATURE COMPENSATION

CROSS REFERENCE TO RELATED APPLICATIONS

This application is a continuation of U.S. patent application Ser. No. 15/712,460, filed Sep. 22, 2017, which claims the benefit of U.S. Provisional Application No. 62/511,818, filed on May 26, 2017, the contents of which are herein expressly incorporated by reference for all purposes.

BACKGROUND

The present disclosure relates generally to techniques to cancelling noise resultant in a display. More specifically, the present disclosure relates generally to techniques for compensating for artifacts and/or non-uniformity in a display panel based at least in part on display variations due to temperature.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic display panels are used in a plethora of electronic devices. These display panels typically consist of multiple pixels that emit light. These pixels may be formed using self-emissive units (e.g., light emitting diode) or pixels that utilize units that are backlit (e.g., liquid crystal diode). These displays may undergo temporal temperature shifts and/or temporal differences across the panel that may cause the display to behave differently than intended, such as artifacts or non-uniform displaying due to temperature changes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

To address temperature-based display fluctuations, a temperature index may be received from a sensor and/or calculations that indicates a temperature of the system, a pixel, a panel, a grid of a panel, or a combination thereof. The temperature is used to predict a voltage change across an emissive element ($V_{HILO}$), such as an organic light emitting diode (OLED). This predicted voltage change is then compensated for before emission. For instance, the pixel voltage (e.g., voltage of a node in the pixel) is pre-adjusted to compensate for the predicted $V_{HILO}$ change.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Display panel quality and/or uniformity can be negatively effected by temperature. For example, as the temperature changes a voltage ($V_{HILO}$) across the high and low terminals of a light-emissive solid-state device may cause unintended variation of light emission from the light-emissive solid-state device. The light-emissive solid-state device may include an organic light emitting diode (OLED), a light emitting diode (LED), or the like. Herein, the following refers to an OLED, but some embodiments may include any other light-emissive solid-state devices.

Specifically, as the temperature changes in a pixel around the OLED, a corresponding driving transistor (e.g., thin-film transistor TFT) fluctuates a voltage/current provided to the OLED. Using a temperature index and a relationship between system temperature and a temperature of the OLED, a $V_{HILO}$ may be predicted and compensated for even when direct measurement of the OLED temperature is impossible or impractical.

Figure 1:
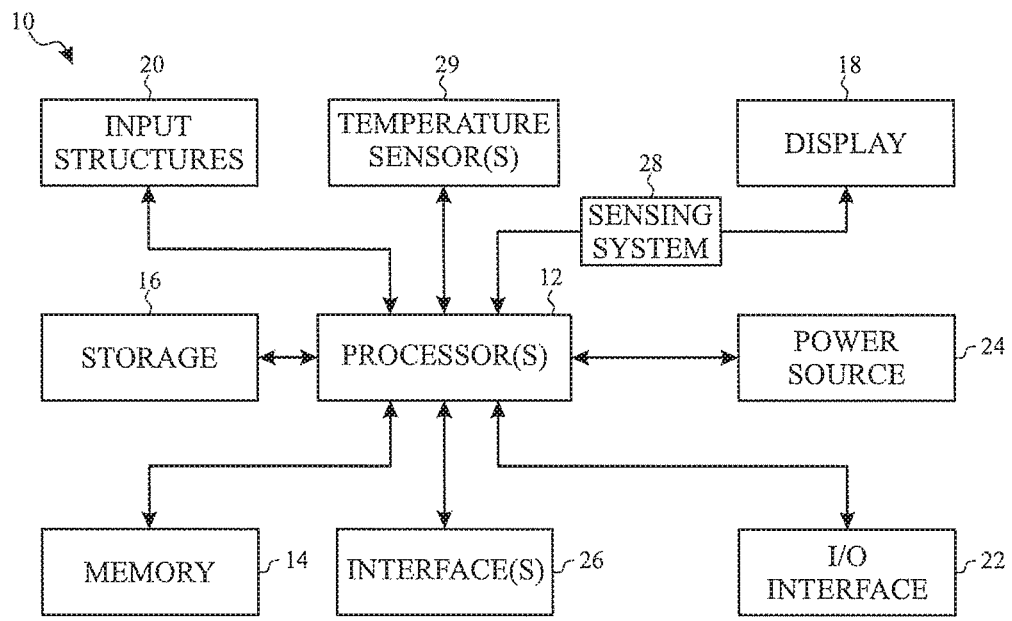
FIG. 1 is a schematic block diagram of an electronic device including a display, in accordance with an embodiment.

With the foregoing in mind and referring first to FIG. 1, an electronic device 10 according to an embodiment of the present disclosure may include, among other things, one or more processor(s) 12, memory 14, nonvolatile storage 16, a display 18, input structures 20, an input/output (I/O) interface 22, a power source 24, and interface(s) 26. The various functional blocks shown in FIG. 1 may include hardware elements (e.g., including circuitry), software elements (e.g., including computer code stored on a computer-readable medium) or a combination of both hardware and software elements. It should be noted that FIG. 1 is merely one example of a particular implementation and is intended to illustrate the types of components that may be present in electronic device 10.

In the electronic device 10 of FIG. 1, the processor(s) 12 and/or other data processing circuitry may be operably coupled with the memory 14 and the nonvolatile storage 16 to perform various algorithms. Such programs or instructions, including those for executing the techniques described herein, executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and/or optical discs. Also, programs (e.g., an operating system) encoded on such a computer program product may also include instructions that may be executed by the processor(s) 12 to enable the electronic device 10 to provide various functionalities.

In certain embodiments, the display 18 may be a liquid crystal display (e.g., LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more light emitting diode (e.g., LED) displays, or some combination of LCD panels and LED panels.

The input structures 20 of the electronic device 10 may enable a user to interact with the electronic device 10 (e.g., pressing a button to increase or decrease a volume level, a camera to record video or capture images). The I/O interface 22 may enable the electronic device 10 to interface with various other electronic devices. Additionally or alternatively, the I/O interface 22 may include various types of ports that may be connected to cabling. These ports may include standardized and/or proprietary ports, such as USB, RS232, Apple's Lightning® connector, as well as one or more ports for a conducted RF link.

As further illustrated, the electronic device 10 may include the power source 24. The power source 24 may include any suitable source of power, such as a rechargeable lithium polymer (e.g., Li-poly) battery and/or an alternating current (e.g., AC) power converter. The power source 24 may be removable, such as a replaceable battery cell.

The interface(s) 26 enable the electronic device 10 to connect to one or more network types. The interface(s) 26 may also include, for example, interfaces for a personal area network (e.g., PAN), such as a Bluetooth network, for a local area network (e.g., LAN) or wireless local area network (e.g., WLAN), such as an 802.11 Wi-Fi network or an 802.15.4 network, and/or for a wide area network (e.g., WAN), such as a 3rd generation (e.g., 3G) cellular network, 4th generation (e.g., 4G) cellular network, or long term evolution (e.g., LTE) cellular network. The interface(s) 26 may also include interfaces for, for example, broadband fixed wireless access networks (e.g., WiMAX), mobile broadband Wireless networks (e.g., mobile WiMAX), and so forth.

In certain embodiments, the electronic device 10 may include a sensing system 28, which may include a chip, such as processor or ASIC, that may control various aspects of the display 18. For instance, the sensing system 28 may use a voltage/current that is to be provided to a pixel of the display 18 to sense the gray level depicted by the pixel. Generally, when the same voltage/current is provided to each pixel of the display 18, each pixel should depict the same gray level. However, due to various sources of noise or non-uniformity (e.g., temperature response), the same voltage/current being applied to a number of pixels may result in a variety of different gray levels depicted across the number of pixels. As such, the sensing system 28 may sense a threshold voltage of each pixel, a power output by each pixel, an amount of current provided to each pixel and the sensing system 28 may send the threshold voltage to the processor(s) 12 or other circuit component to determine a compensation value for each pixel. The processor(s) 12 may then adjust the data signals provided to each pixel based on the compensation value. Although the sensing system 28 is described as providing the threshold voltage or sensitivity characteristics to another circuit component that may determine a compensation value, it should be noted that, in some embodiments, the sensing system 28 may also perform the determination of the compensation value and the modification of the data provided to a pixel based on the compensation value.

The electronic device 10 may also include one or more temperature sensors 29 that enable measurement of a temperature in and/or around the electronic device. A single sensor may be used to find an overall system temperature. Additionally or alternatively, a grid system may be used to track temperatures at various locations within the device using direct measurements from a temperature sensor in at least a portion of the grid locations. Furthermore, in some embodiments, some temperatures about the display may be interpolated from conditions (e.g., camera running, display running, processor usage, etc.). For example, a temperature of portions near a camera of the electronic device 10 may be set as being higher than a measured temperature away from the camera when the camera is operating.

Figure 2:
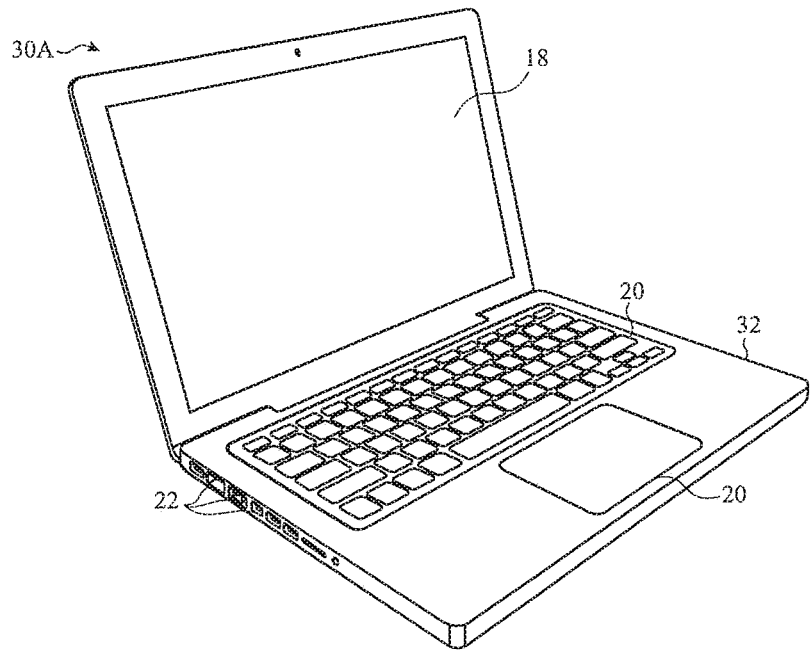
FIG. 2 is a perspective view of a notebook computer representing an embodiment of the electronic device of FIG. 1, in accordance with an embodiment.
Figure 3:
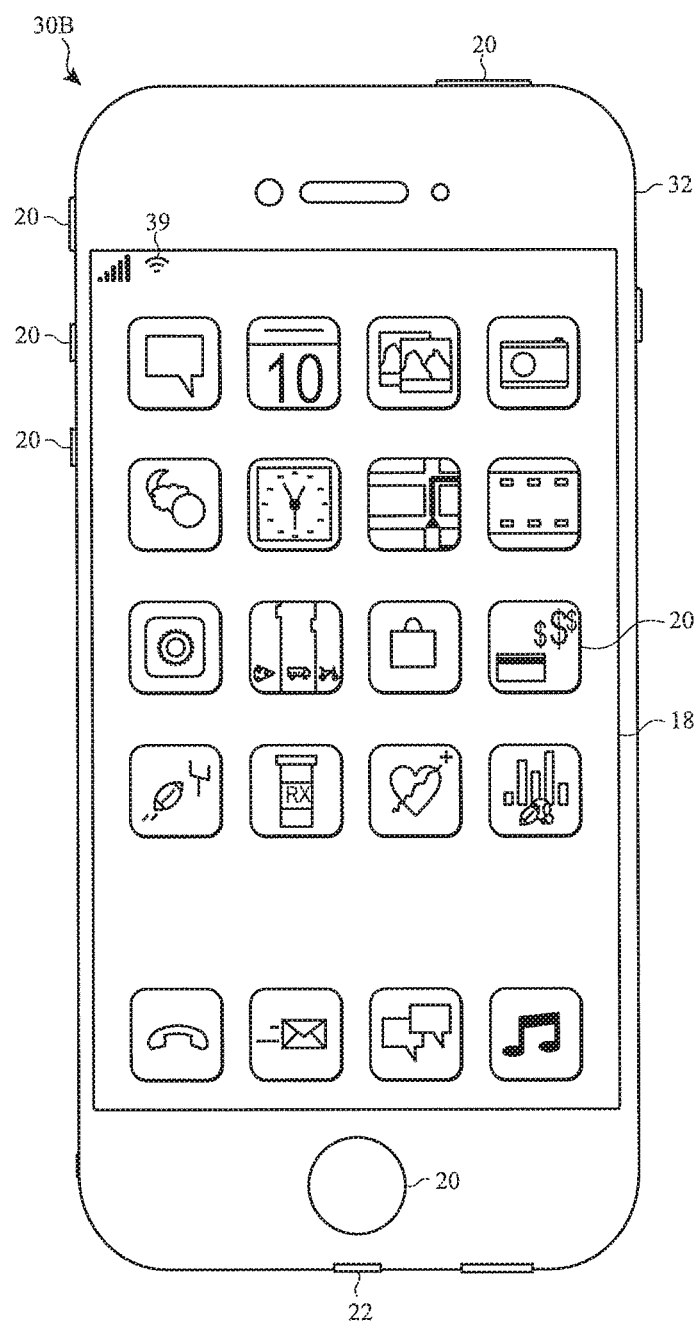
FIG. 3 is a front view of a hand-held device representing another embodiment of the electronic device of FIG. 1, in accordance with an embodiment.
Figure 4:
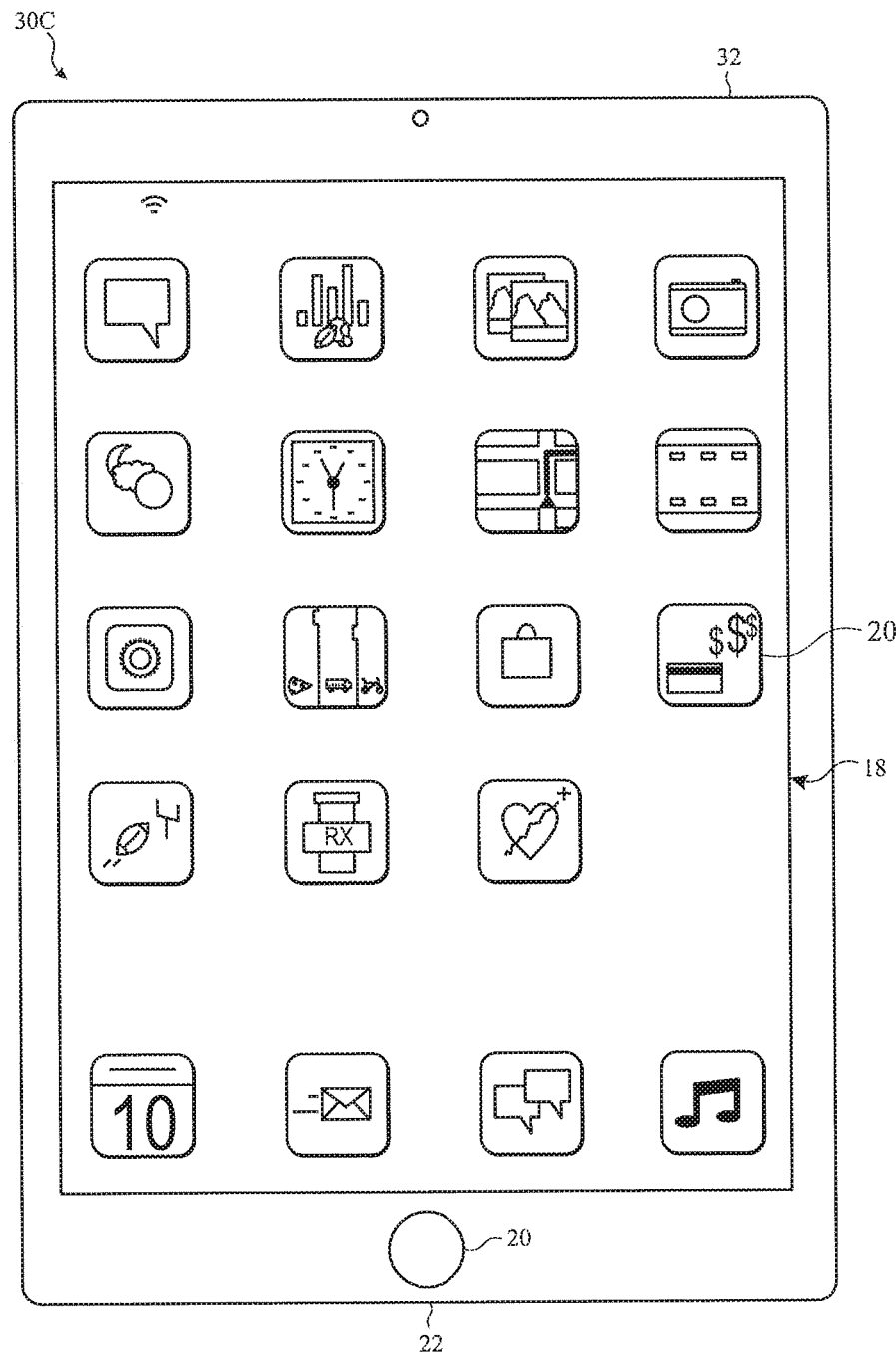
FIG. 4 is a front view of another hand-held device representing another embodiment of the electronic device of FIG. 1, in accordance with an embodiment.
Figure 5:
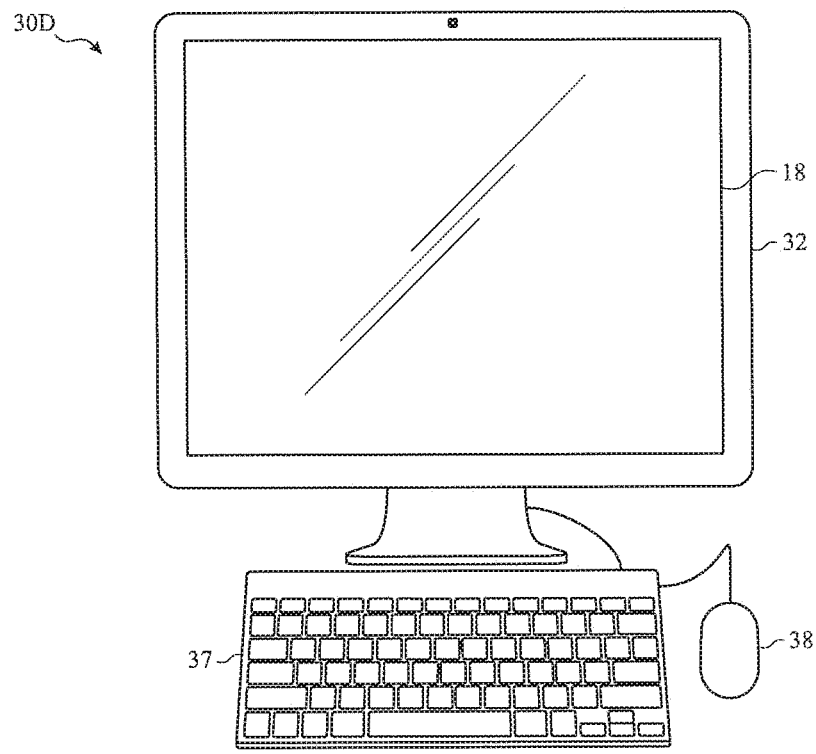
FIG. 5 is a front view of a desktop computer representing another embodiment of the electronic device of FIG. 1, in accordance with an embodiment.
Figure 6:
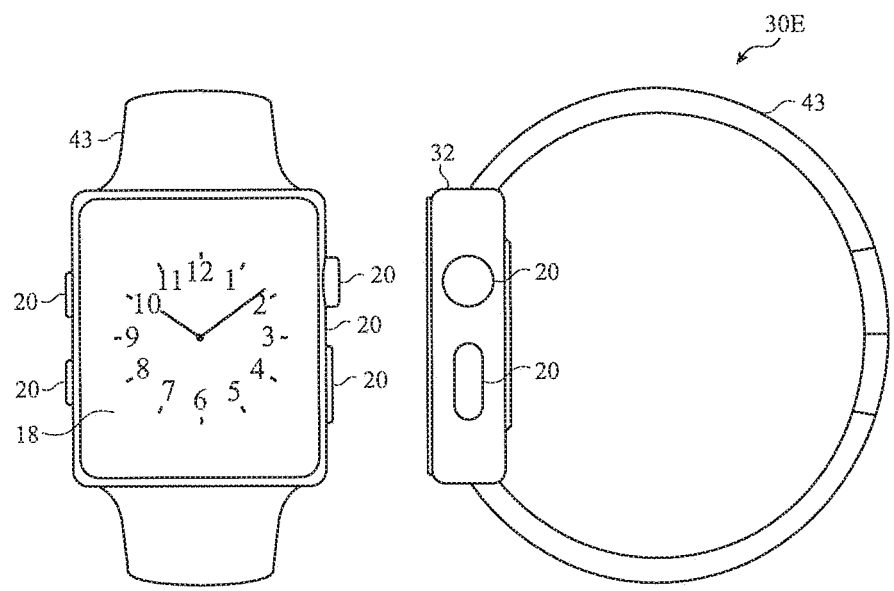
FIG. 6 is a front view of a wearable electronic device representing another embodiment of the electronic device of FIG. 1, in accordance with an embodiment.

By way of example, the electronic device 10 may represent a block diagram of the notebook computer depicted in FIG. 2, the handheld device depicted in either of FIG. 3 or FIG. 4, the desktop computer depicted in FIG. 5, the wearable electronic device depicted in FIG. 6, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In certain embodiments, the electronic device 10 may take the form of a computer, a portable electronic device, a wearable electronic device, or other type of electronic device. Such computers may include computers that are generally portable (e.g., such as laptop, notebook, and tablet computers) as well as computers that are generally used in one place (e.g., such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure. The depicted computer 30A may include a housing or enclosure 32, a display 18, input structures 20, and ports of the I/O interface 22. In one embodiment, the input structures 20 (e.g., such as a keyboard and/or touchpad) may be used to interact with the computer 30A, such as to start, control, or operate a GUI or applications running on computer 30A. For example, a keyboard and/or touchpad may allow a user to navigate a user interface or application interface displayed on display 18.

FIG. 3 depicts a front view of a handheld device 30B, which represents one embodiment of the electronic device 10. The handheld device 30B may represent, for example, a portable phone, a media player, a personal data organizer, a handheld game platform, or any combination of such devices. By way of example, the handheld device 30B may be a model of an iPod® or iPhone® available from Apple Inc. of Cupertino, Calif.

The handheld device 30B may include an enclosure 32 to protect interior components from physical damage and to shield them from electromagnetic interference. The enclosure 32 may surround the display 18, which may display indicator icons. The indicator icons may indicate, among other things, a cellular signal strength, Bluetooth connection, and/or battery life. The I/O interfaces 22 may open through the enclosure 32 and may include, for example, an I/O port for a hard-wired connection for charging and/or content manipulation using a connector and protocol, such as the Lightning connector provided by Apple Inc., a universal serial bus (e.g., USB), one or more conducted RF connectors, or other connectors and protocols.

The illustrated embodiments of the input structures 20, in combination with the display 18, may allow a user to control the handheld device 30B. For example, a first input structure 20 may activate or deactivate the handheld device 30B, one of the input structures 20 may navigate user interface to a home screen, a user-configurable application screen, and/or activate a voice-recognition feature of the handheld device 30B, while other of the input structures 20 may provide volume control, or may toggle between vibrate and ring modes. Additional input structures 20 may also include a microphone that may obtain a user's voice for various voice-related features, and a speaker to allow for audio playback and/or certain phone capabilities. The input structures 20 may also include a headphone input (not illustrated) to provide a connection to external speakers and/or headphones and/or other output structures.

FIG. 4 depicts a front view of another handheld device 30C, which represents another embodiment of the electronic device 10. The handheld device 30C may represent, for example, a tablet computer, or one of various portable computing devices. By way of example, the handheld device 30C may be a tablet-sized embodiment of the electronic device 10, which may be, for example, a model of an iPad® available from Apple Inc. of Cupertino, Calif.

Turning to FIG. 5, a computer 30D may represent another embodiment of the electronic device 10 of FIG. 1. The computer 30D may be any computer, such as a desktop computer, a server, or a notebook computer, but may also be a standalone media player or video gaming machine. By way of example, the computer 30D may be an iMac®, a MacBook®, or other similar device by Apple Inc. It should be noted that the computer 30D may also represent a personal computer (e.g., PC) by another manufacturer. A similar enclosure 32 may be provided to protect and enclose internal components of the computer 30D such as the display 18. In certain embodiments, a user of the computer 30D may interact with the computer 30D using various peripheral input devices, such as the keyboard 37 or mouse 38, which may connect to the computer 30D via an I/O interface 22.

Similarly, FIG. 6 depicts a wearable electronic device 30E representing another embodiment of the electronic device 10 of FIG. 1 that may be configured to operate using the techniques described herein. By way of example, the wearable electronic device 30E, which may include a wristband 43, may be an Apple Watch® by Apple, Inc. However, in other embodiments, the wearable electronic device 30E may include any wearable electronic device such as, for example, a wearable exercise monitoring device (e.g., pedometer, accelerometer, heart rate monitor), or other device by another manufacturer. The display 18 of the wearable electronic device 30E may include a touch screen (e.g., LCD, an organic light emitting diode display, an active-matrix organic light emitting diode (e.g., AMOLED) display, and so forth), which may allow users to interact with a user interface of the wearable electronic device 30E.

Having provided some context with regard to possible forms that the electronic device 10 may take, the present discussion will now focus on the sensing system 28 of FIG.

Figure 7:
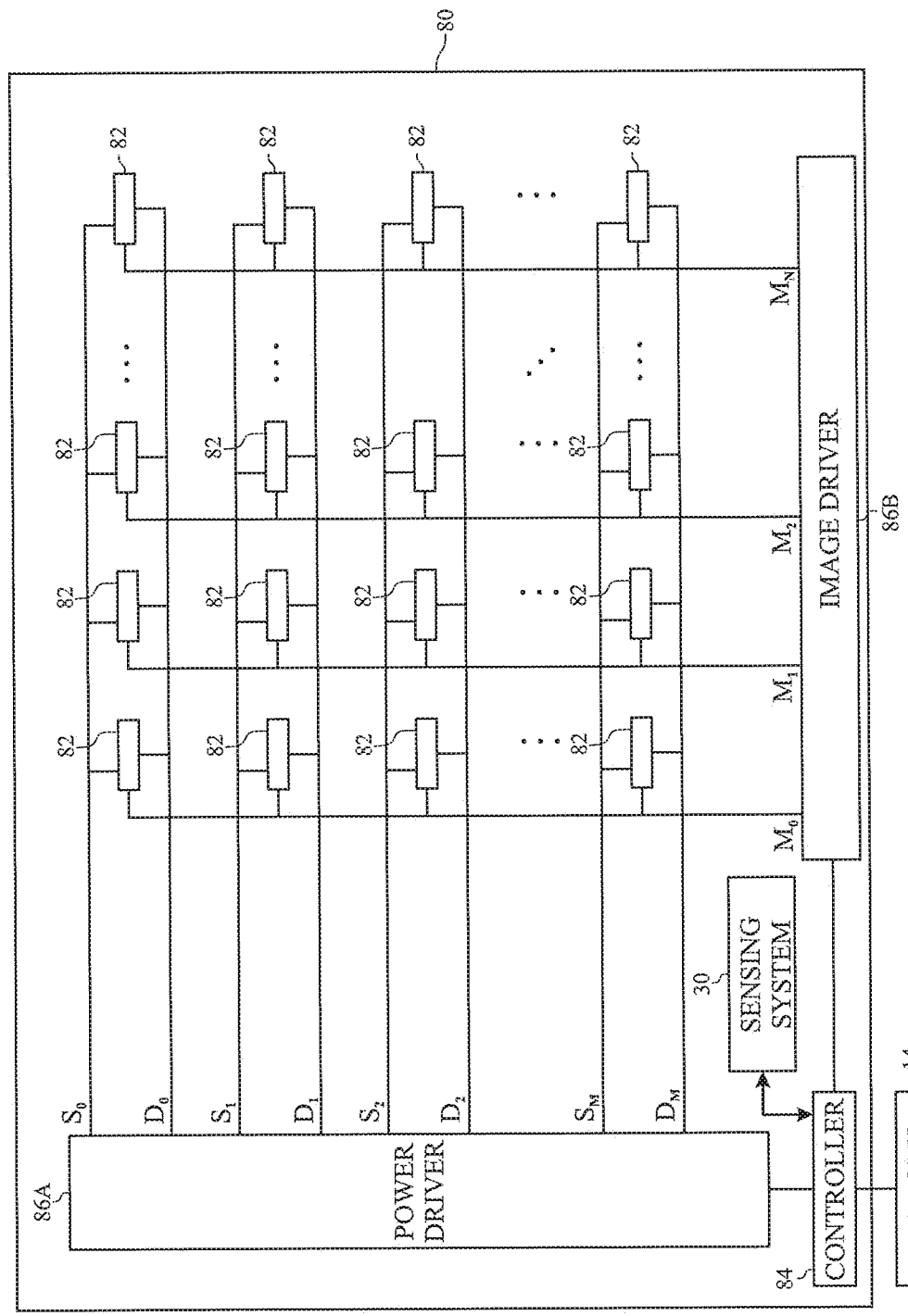
FIG. 7 illustrates a block diagram view a circuit diagram of the display of FIG. 1, in accordance with an embodiment.

1. Generally, the brightness depicted by each respective pixel in the display 18 is generally controlled by varying an electric field associated with each respective pixel in the display 18. Keeping this in mind, FIG. 7 illustrates one embodiment of a circuit diagram of the display 18 that may generate the electrical field that energizes each respective pixel and causes each respective pixel to emit light at an intensity corresponding to an applied voltage. As shown, display 18 may include a self-emissive pixel array 80 having an array of self-emissive pixels 82.

The self-emissive pixel array 80 is shown having a controller 84, a power driver 86A, an image driver 86B, and the array of self-emissive pixels 82. The self-emissive pixels 82 are driven by the power driver 86A and image driver 86B. Each power driver 86A and image driver 86B may drive one or more self-emissive pixels 82. In some embodiments, the power driver 86A and the image driver 86B may include multiple channels for independently driving multiple self-emissive pixels 82. The self-emissive pixels may include any suitable light-emitting elements, such as organic light emitting diodes (OLEDs), micro-light-emitting-diodes (p-LEDs), and the like.

The power driver 86A may be connected to the self-emissive pixels 82 by way of scan lines $S_0, S_1, \ldots S_{m-1}$, and $S_m$ and driving lines $D_0, D_1, \ldots D_{m-1}$, and $D_m$. The self-emissive pixels 82 receive on/off instructions through the scan lines $S_0, S_1, \ldots S_{m-1}$, and $S_m$ and generate driving currents corresponding to data voltages transmitted from the driving lines $D_0, D_1, \ldots D_{m-1}$, and $D_m$. The driving currents are applied to each self-emissive pixel 82 to emit light according to instructions from the image driver 86B through driving lines $M_0, M_1, \ldots M_{n-1}$, and $M_n$. Both the power driver 86A and the image driver 86B transmit voltage signals through respective driving lines to operate each self-emissive pixel 82 at a state determined by the controller 84 to emit light. Each driver may supply voltage signals at a duty cycle and/or amplitude sufficient to operate each self-emissive pixel 82.

The controller 84 may control the color of the self-emissive pixels 82 using image data generated by the processor(s) 12 and stored into the memory 14 or provided directly from the processor(s) 12 to the controller 84. The sensing system 28 may provide a signal to the controller 84 to adjust the data signals transmitted to the self-emissive pixels 82 such that the self-emissive pixels 82 may depict substantially uniform color and luminance provided the same current input in accordance with the techniques that will be described in detail below.

Figure 8:
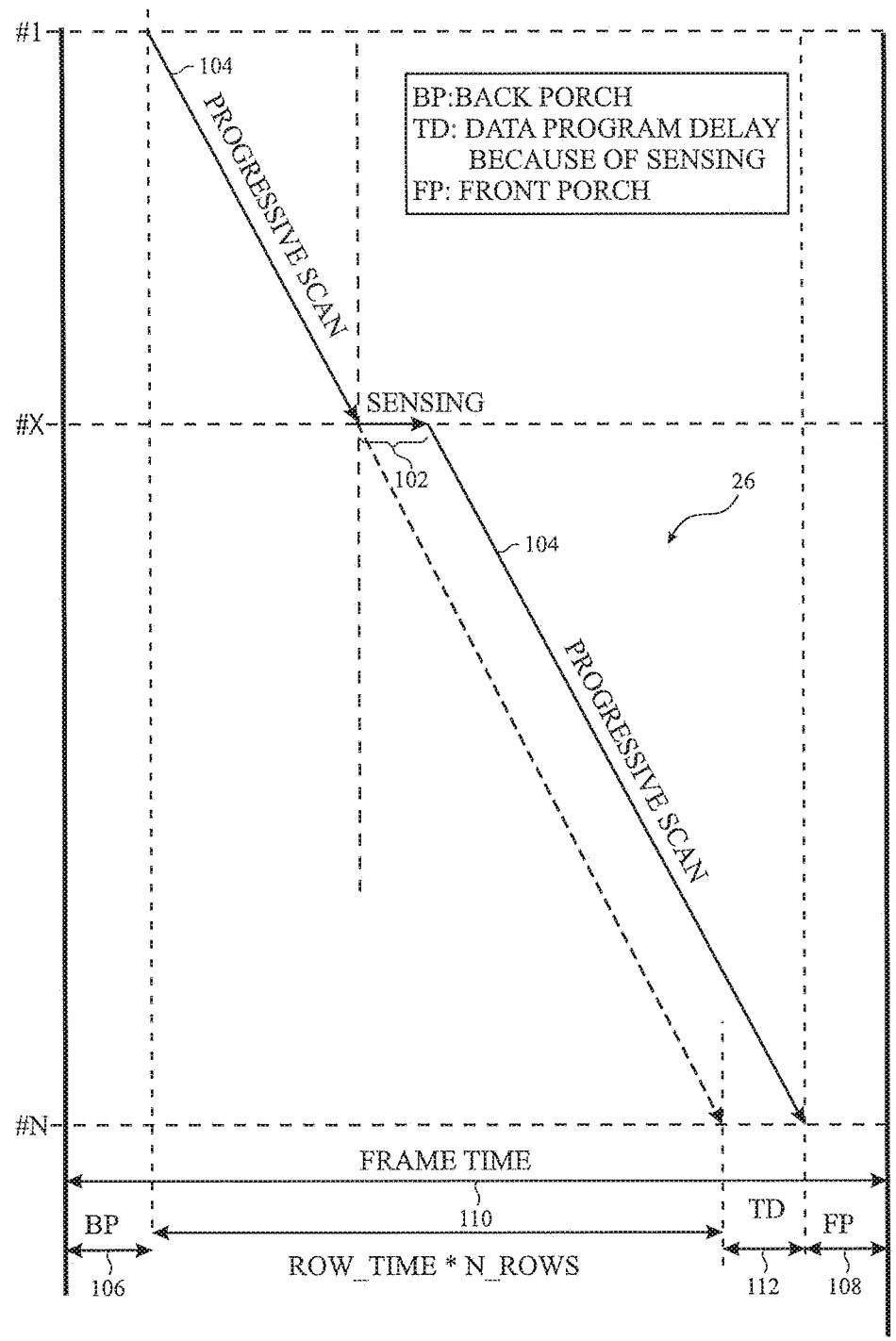
FIG. 8 illustrates a block diagram of a sensing period during a progressive scan of a display, in accordance with an embodiment.

With the foregoing in mind, FIG. 8 illustrates an embodiment in which the sensing system 28 may incorporate a sensing period during a progressive data scan of the display 18. In some embodiments, the controller 84 may send data (e.g., gray level voltages or currents) to each self-emissive pixel 82 via the power driver 86A on a row-by-row basis. That is, the controller 84 may initially cause the power driver 86A to send data signals to the pixels 82 of the first row of pixels on the display 18, then the second row of pixels on the display 18, and so forth. When incorporating a sensing period, the sensing system 28 may cause the controller 84 to pause the transmission of data via the power driver 86A for a period of time (e.g., 100 microseconds) during the progressive data scan at a particular row of the display (e.g., for row X). The period of time in which the power driver 86A stops transmitting data corresponds to a sensing period 102.

As shown in FIG. 8, the progressive scan 104 is performed between a back porch 106 and a front porch 108 of a frame 110 of data. The progressive scan 104 is interrupted by the sensing period 102 while the power driver 86A is transmitting data to row X of the display 18. The sensing period 102 corresponds to a period of time in which a data signal may be transmitted to a respective pixel 82, and the sensing system 28 may determine certain sensitivity properties associated to the respective pixel 82 based on the pixel's reaction to the data signal. The sensitivity properties may include, for example, power, luminance, and color values of the respective pixel when driven by the provided data signal. After the sensing period 102 expires, the sensing system 28 may cause the power driver 86A to resume the progressive scan 104. As such, the progressive scan 104 may be delayed by a data program delay 112 due to the sensing period 102.

In order to incorporate the sensing period 102 into the progressive scans of the display 18, pixel driving circuitry may transmit data signals to pixels of each row of the display 18 and may pause its transmission of data signals during any portion of the progressive scan to determine the sensitivity properties of any pixel on any row of the display 18. Moreover, as sizes of displays decrease and smaller bezel or border regions are available around the display, integrated gate driver circuits may be developed using a similar thin film transistor process as used to produce the transistors of the pixels 82. In some embodiments, the sensing periods may be between progressive scans of the display.

Figure 9:
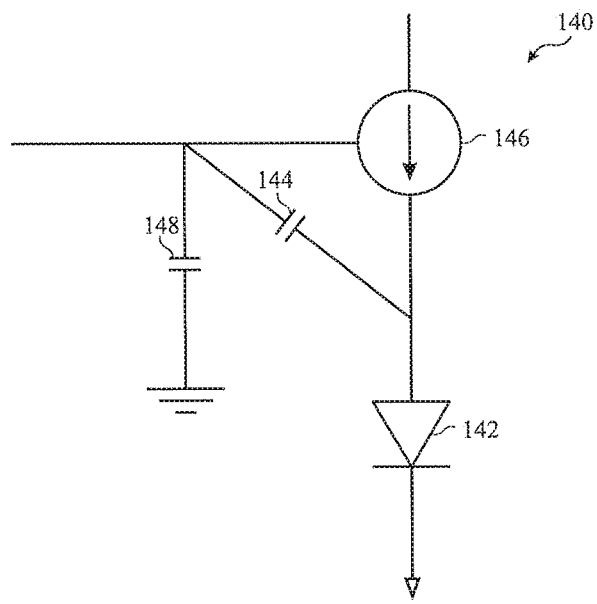
FIG. 9 illustrates a block diagram view of a simplified pixel in the circuit diagram of FIG. 9, in accordance with an embodiment.

FIG. 9 is a block diagram for a simplified pixel 140 that controls emission of an OLED 142. As illustrated, the OLED 142 is an active matrix OLED (AMOLED) that uses a storage capacitor 144 that enables data to be written to the storage capacitor 144 to multiple pixel rows and/or columns sequentially. The storage capacitor 144 maintains a line pixel state in the pixel 140. The pixel 140 also includes a current source 146 that may be representative of one or more TFTs that provide a current to the OLED 142.

The output of the current source 146 depends upon the voltage stored in the storage capacitor 144. For example, the storage capacitor 144 may equal a gate-source voltage $V_{GS}$ of a TFT of the current source 146. However, the voltage in the storage capacitor 144 may change due to parasitic capacitances represented by the capacitor 148. The amount of parasitic capacitance may change with temperature that causes operation of the current source 146 to vary thereby causing changes in emission of the OLED 142 based at least in part on temperature fluctuations. Temperature may also cause other fluctuations in the pixel current through the OLED 42, such as fluctuations of operation of the TFTs making up the current source and/or operation of the OLED 46 itself.

Figure 10A:
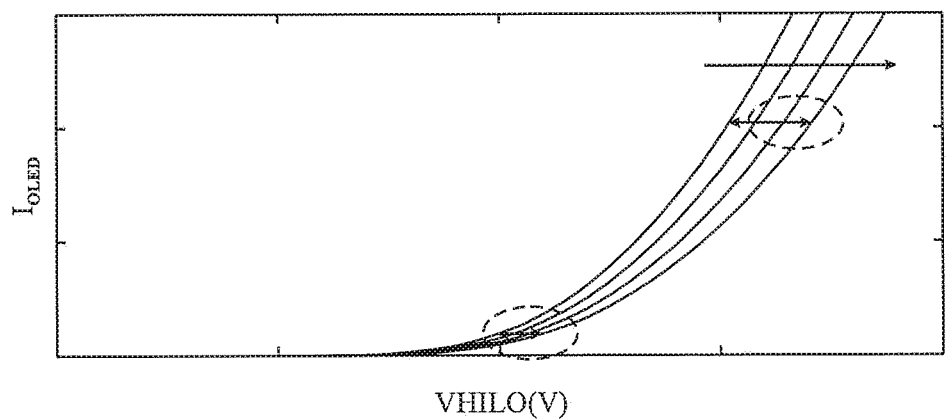
FIG. 10A illustrates a graph of a relationship between an OLED current and $V_{HILO}$ in various temperatures for a red pixel, in accordance with an embodiment.
Figure 10B:
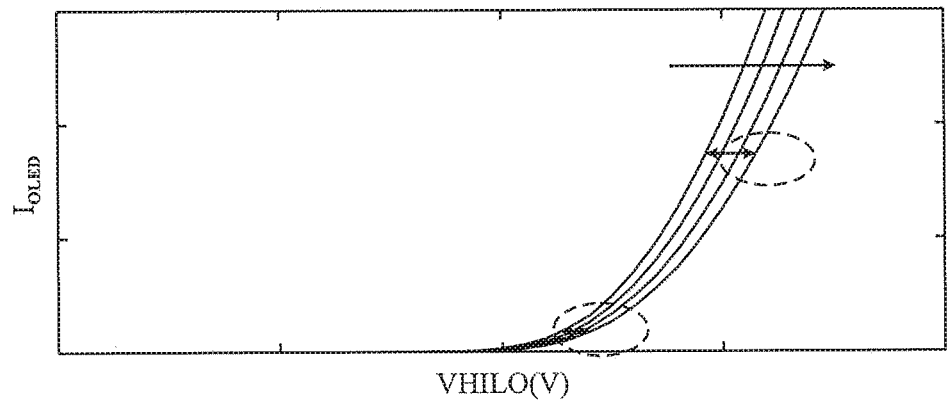
FIG. 10B illustrates a graph of a relationship between an OLED current and $V_{HILO}$ in various temperatures for a green pixel, in accordance with an embodiment.
Figure 10C:
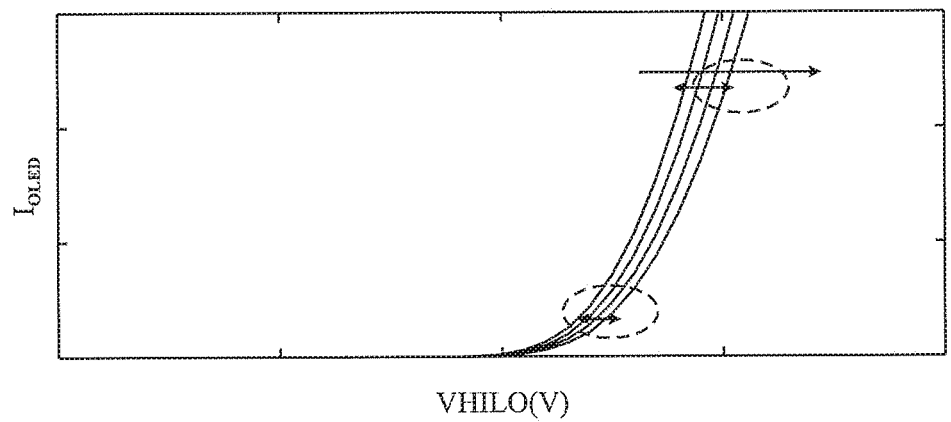
FIG. 10CA illustrates a graph of a relationship between an OLED current and $V_{HILO}$ in various temperatures for a blue pixel, in accordance with an embodiment.

FIGS. 10A-10C illustrates graph of $V_{HILO}$ versus the current $I_{OLED}$ through the OLED 42 over various temperatures (e.g., 45° C. to 30° C.). However, the change may vary based on a color of the OLED. For example, FIG. 10A may represent a change in ratio of $V_{HILO}$ to $I_{OLED}$ for a red color OLED, FIG. 10B may represent a change in ratio of $V_{HILO}$ to $I_{OLED}$ for a green color OLED, and FIG. 10C may represent a change in ratio of $V_{HILO}$ to $I_{OLED}$ for a blue color OLED.

Figure 11A:
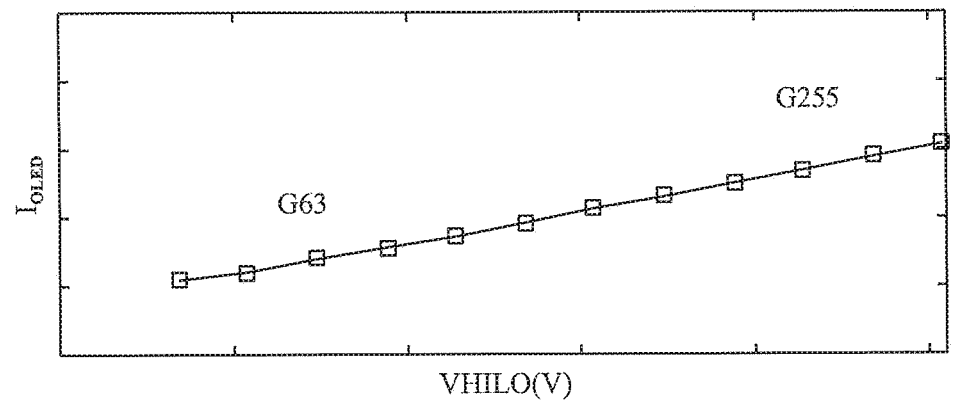
FIG. 11A illustrates a block diagram view a graph showing a relationship between gray level and $V_{HILO}$ shift for a red pixel, in accordance with an embodiment.
Figure 11B:
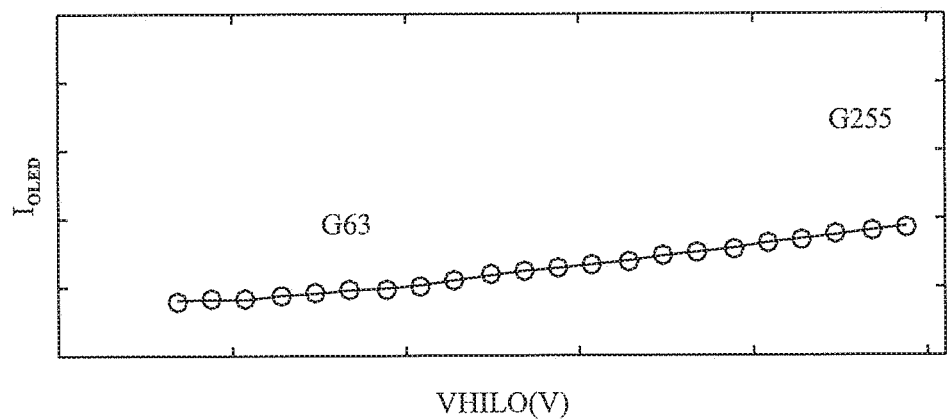
FIG. 11B illustrates a block diagram view a graph showing a relationship between gray level and $V_{HILO}$ shift for a green pixel, in accordance with an embodiment.
Figure 11C:
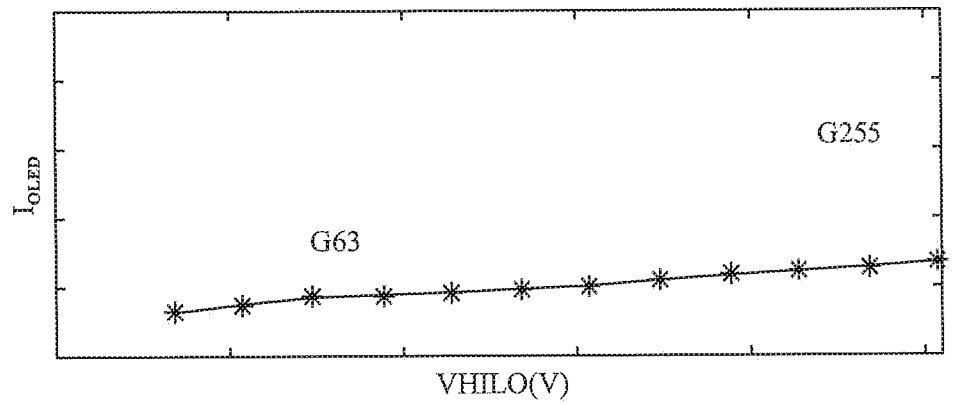
FIG. 11C illustrates a block diagram view a graph showing a relationship between gray level and $V_{HILO}$ shift for a blue pixel, in accordance with an embodiment.

Furthermore, grayscale levels may also affect a change in an amount of shift in $V_{HILO}$ and its corresponding $I_{OLED}$. FIGS. 11A-11C illustrate such relationships. As with the relationship between $V_{HILO}$ and $I_{OLED}$, the relationship between gray level and $V_{HILO}$ shift may be color-dependent. For example, FIG. 11A may represent a relationship between a gray level and a $V_{HILO}$ shift for a red OLED, FIG. 11B may represent a relationship between a gray level and a $V_{HILO}$ shift for a green OLED, and FIG. 11C may represent a relationship between a gray level and a $V_{HILO}$ shift for a blue OLED.

Figure 12:
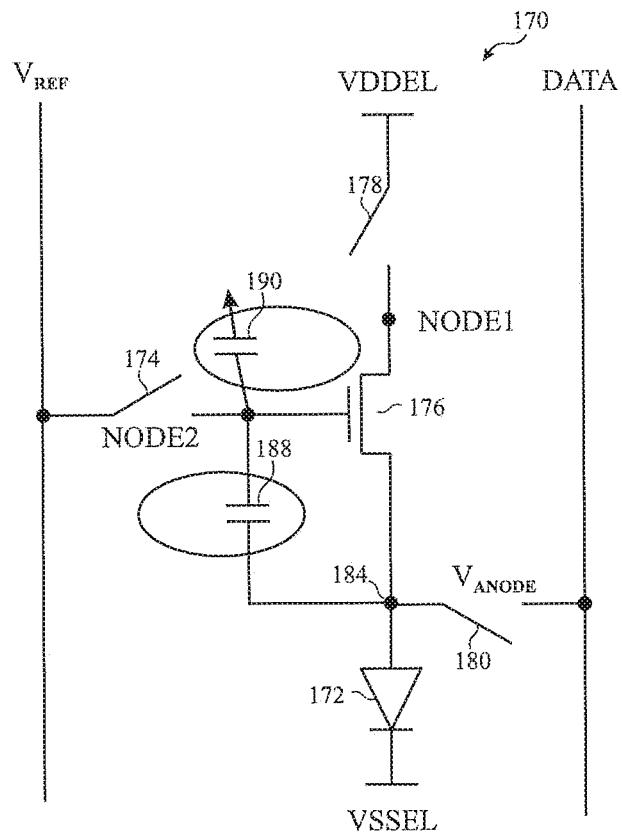
FIG. 12 illustrates a schematic diagram of pixel control circuitry for an OLED, in accordance with an embodiment.

FIG. 12 illustrates a more detailed depiction of an embodiment of a pixel control circuitry. The pixel driving circuitry 170 may include a number of semiconductor devices that may coordinate the transmission of data signals to an OLED 172 of a respective pixel 82. In some embodiments, the pixel driving circuitry 170 may receive input signals (e.g., an emission signal and/or one or more scan signals).

With this in mind, the pixel driving circuitry 170 may include switches 174, 178, and 180 along with transistor 176. These switches may include any type of suitable circuitry, such as transistors. Transistors (e.g., transistor 176) may include N-type and/or P-type transistors. That is, depending of the type of transistors used within the pixel driving circuitry 170, the waveforms or signals provided to each transistor should be coordinated in a manner to cause the pixel control circuitry.

As shown in FIG. 12, the transistor 176 and the switches 174, 178, and 180 may be driven by scan and emission signals. Based on these input signals, the pixel driving circuitry 170 may implement a number of pixel driving schemes for a respective pixel.

Figure 13:
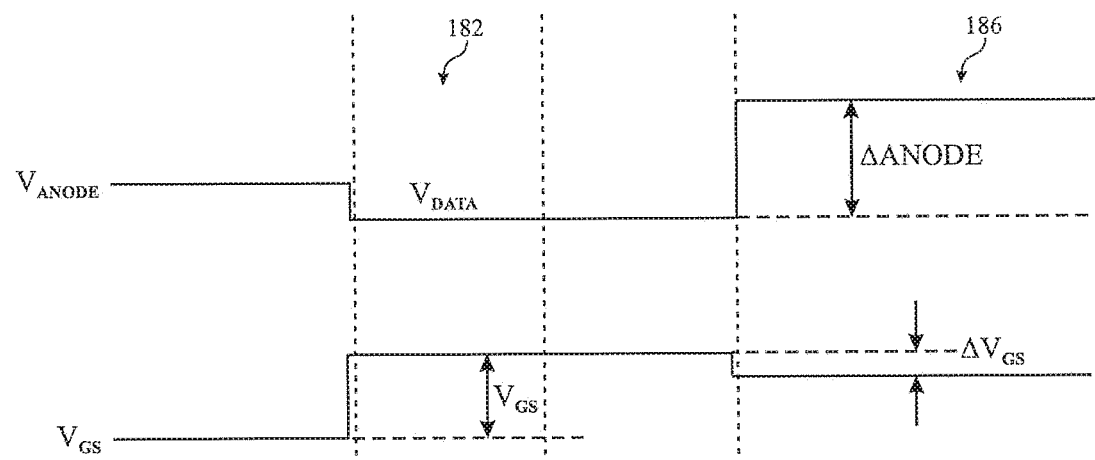
FIG. 13 is timing diagram of ideal operation of the pixel control circuitry of FIG. 12, in accordance with an embodiment.

As illustrated in FIG. 13, the scan and/or emission signals may cause the pixel control circuitry 170 to be placed in a data write mode 182. During the data write mode 182, a voltage $V_{ANODE}$ at a node 184 in FIG. 11 between the transistor 176 and the switch 180 is driven to a voltage $V_{DATA}$ of the data. Returning to FIG. 12, in a subsequent emission period 186 (e.g., caused by the emission signal), the $V_{ANODE}$ becomes a sum of a VSSEL supply voltage (e.g., −3V~−2.5V), the $V_{HILO}$. The gate-source voltage $V_{GS}$ of the transistor 176 (across storage capacitor 188) also changes by $\Delta V_{GS}$ during the emission period 186. This $\Delta V_{GS}$ is determined by $V_{HILO}$ sensitivity and the $V_{ANODE}$. The $V_{HILO}$ sensitivity is a ratio of a parasitic capacitance at the gate of transistor 176 (represented by gate capacitor 190 in FIG. 11) to a sum of capacitances of the storage capacitor 188 and the parasitic capacitance 190.

$$\Delta V_{GS} = V_{HILO} \text{ sensitivity} \times \Delta V_{ANODE} = \frac{C_{GATE}}{(C_{ST} + C_{GATE})} \times \Delta V_{ANODE}, \quad \text{(Equation 1)}$$

where $C_{GATE}$ is the capacitance of parasitic capacitance at the gate and $C_{ST}$ is the capacitance of the storage capacitor 188.

Figure 14:
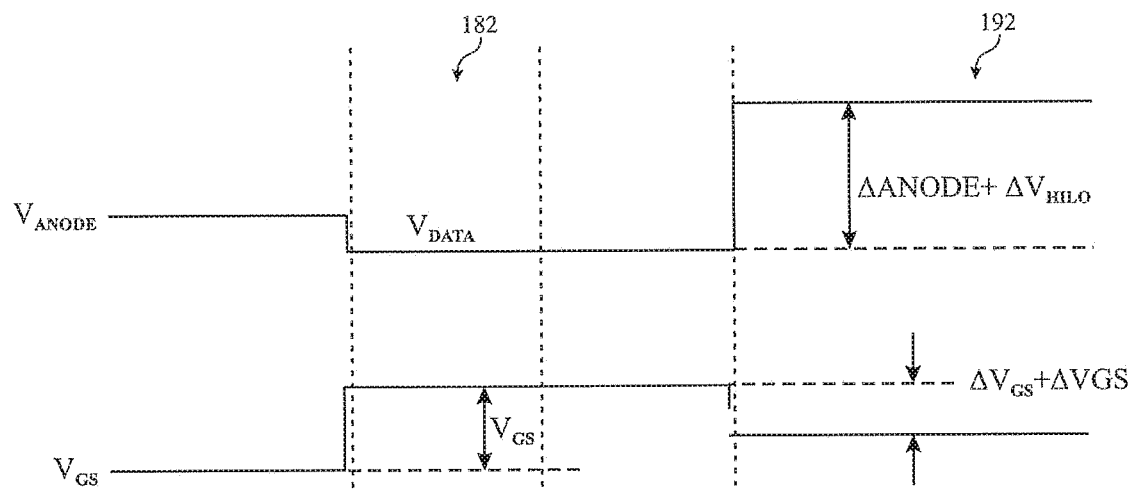
FIG. 14 is timing diagram of non-ideal operation of the pixel control circuitry of FIG. 12, in accordance with an embodiment.

Although the pixel sensitivity ratio may be reduced by increasing capacitance of the storage capacitor, size in the pixel control circuitry 170 may be limited due to display size, compactness of pixels (i.e., pixels-per-inch), part costs, and/or other constraints. In other words, the $V_{HILO}$ sensitivity cannot be reasonably eliminated. Thus, in realistic situations, as previously discussed, $V_{HILO}$ may shift due to temperature and/or other causes. FIG. 14 illustrates an embodiment of emission levels in response to a $V_{HILO}$ shift. The data write period 182 remains unchanged. However, in emission period 192 the $V_{ANODE}$ is the sum of VSSEL and $V_{HILO}$ including any shift that has occurred on the $V_{HILO}$ as voltage of $\Delta V_{HILO}$ due to temperature and/or other changes. Since the $\Delta V_{HILO}$ shifts the $V_{ANODE}$, the $\Delta V_{HILO}$ also shifts the $V_{GS}$. Thus, the $\Delta V_{HILO}$ creates a $V_{GS}$ error $\Delta V_{gs}$ that is attributable to the $V_{HILO}$ sensitivity and the $\Delta V_{HILO}$ that has been added to the $V_{ANODE}$.

$$\Delta V_{gs} = \frac{C_{GATE}}{(C_{ST} + C_{GATE})} \times \Delta V_{HILO} \quad \text{(Equation 2)}$$

In other words, this $\Delta V_{gs}$ error is created by parasitic capacitance on the gate of the transistor 176 in a source-follower-type pixel. In other embodiments, the error may be shifted around to other locations due to other parasitic capacitances.

Figure 15:
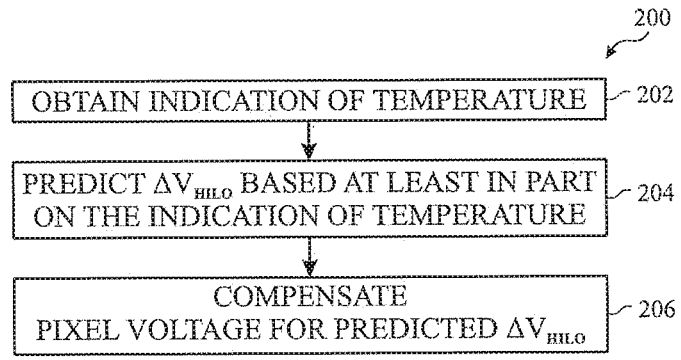
FIG. 15 is a flow chart illustrating a process for compensating for VHILO fluctuations due to temperature, in accordance with an embodiment.

To address these problems a predictive $V_{HILO}$ model may be used to mitigate a temperature effect on $V_{HILO}$. FIG. 15 illustrates an embodiment of a process 200 for mitigating temperature effect on $V_{HILO}$ variation. The processor 12 obtains an indication of temperature (block 202). The indication of temperature may be a direct measurement of a temperature from a temperature sensor. Additionally or alternatively, the indication of the temperature may include adjustments to a measured temperature as an interpolated or calculated temperature. Furthermore, the temperature may be an overall system temperature and/or may include a grid temperature that logically divides the electronic device into regions or grids that have a common temperature indication. The processor 12 then predicts a change in $V_{HILO}$ based at least in part on the indication of the temperature (block 204). If the indication of temperature corresponds to an overall system temperature, the indication of temperature may be interpolated from a system temperature to a temperature for a pixel or group of pixels based on a location of the pixel or group of pixels relative to heat sources in the electronic device 10, operating states (e.g., camera running, high processor usage, etc.) of the electronic device, an outside temperature (e.g., received via the interface 26), and/or other temperature factors.

Using either the received indication directly or an interpolation based on the received indication, the prediction may be performed using a lookup table that has been populated using empirical data reflecting how $\Delta V_{HILO}$ is related to temperature for the pixel in an array of pixels in a display panel, a grid of the panel, an entire panel, and/or a batch of panels. This empirical data may be derived at manufacture of the panels. In some embodiments, the empirical data may be captured multiple times and averaged together to reduce noise in the correlation between $\Delta V_{HILO}$ and temperature. In some embodiments, instead of a lookup table with empirically derived data, the empirical data may be used to derive a transfer function that is formed from a curve fit of one or more empirical data gathering passes.

As previously note, in addition to temperature, $\Delta V_{HILO}$ may depend on grayscale levels and/or emission color of the OLED 172. Thus, the prediction of the $\Delta V_{HILO}$ may also be empirically gathered for color effects and/or grayscale levels. In other words, the predicted $\Delta V_{HILO}$ may be based at least in part on the temperature, the (upcoming) grayscale level of the OLED 172, the color of the OLED 172, or any combination thereof.

The processor 12 compensates a pixel voltage inside the pixel control circuitry 170 to compensate based at least in part on the predicted $\Delta V_{HILO}$ (block 206). Compensation includes offsetting the voltage based on the predicted $\Delta V_{HILO}$ by submitting a voltage having an opposite polarity but similar amplitude on the pixel voltage (e.g., $V_{ANODE}$). The compensation may also include compensating for other temperature-dependent (e.g., transistor properties) or temperature-independent factors. Furthermore, since some grayscale levels are more likely to be visible due to human detection factors or properties of the grayscale level and $\Delta V_{HILO}$, in some embodiments, the compensation voltage may be applied for some grayscale level content but not applied for other grayscale level content.

Figure 16:
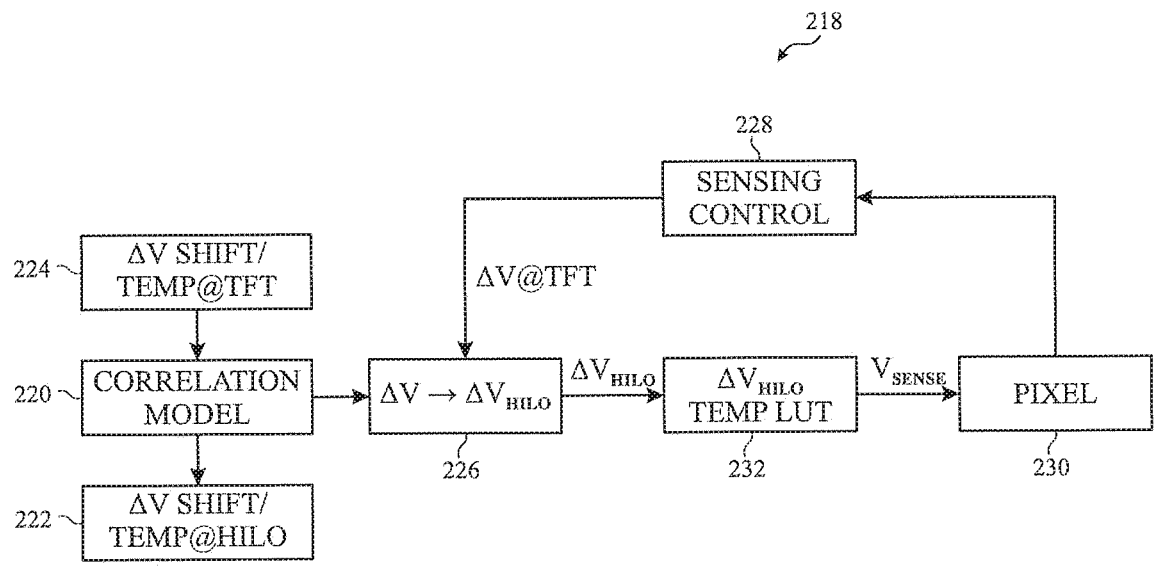
FIG. 16 is a block diagram of a system used to perform the process of FIG. 15, in accordance with an embodiment.

FIG. 16 illustrates an embodiment of a compensation system 218 that utilizes a correlation model 220 that correlates various voltage shifts to a temperature. As previously discussed, this correlation model 220 may receive data corresponding to a first stored relationship 222 between temperature and $\Delta V$ shift at the OLED 172. Additionally or alternatively, the correlation model 220 may receive data corresponding to a second stored relationship 224 between temperature and $\Delta V$ shift at a TFT (e.g., transistor 176). The second stored relationship 224 may also include a temperature index indicating a temperature at the TFT based on direct measurements and/or calculations from a system measurement.

The correlation model 220 is used by the processor 12 to convert to predict $V_{HILO}$ (block 226) based on the temperature index and a current $\Delta V$ as determined from a sensing control 228 used to determine how to drive voltages for operating a pixel. The sensing control 230 is used to control voltages used during an emission state based on results of a sensing phase. Additionally or alternatively, a transfer function may be used from the temperature index/$\Delta V$. This prediction may be made using a first lookup table that converts $\Delta V$ and a temperature index to a predicted $\Delta V_{HILO}$. The predicted $\Delta V_{HILO}$ is then used to determine a $V_{SENSE}$ level that is used in a sensing state to offset the $\Delta V_{HILO}$ using the processor to access a second lookup table (block 232). Additionally or alternatively, a transfer function may be used from $\Delta V_{HILO}$ to determine the $V_{SENSE}$ compensating for the $\Delta V_{HILO}$.

Figure 17:
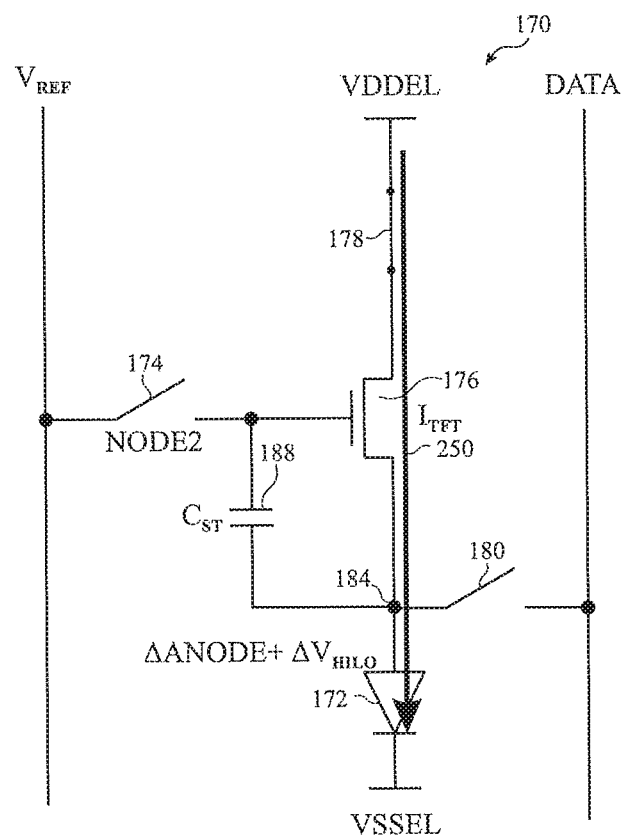
FIG. 17 is a schematic diagram of the pixel control circuitry of FIG. 12 in an emission phase, in accordance with an embodiment.
Figure 18:
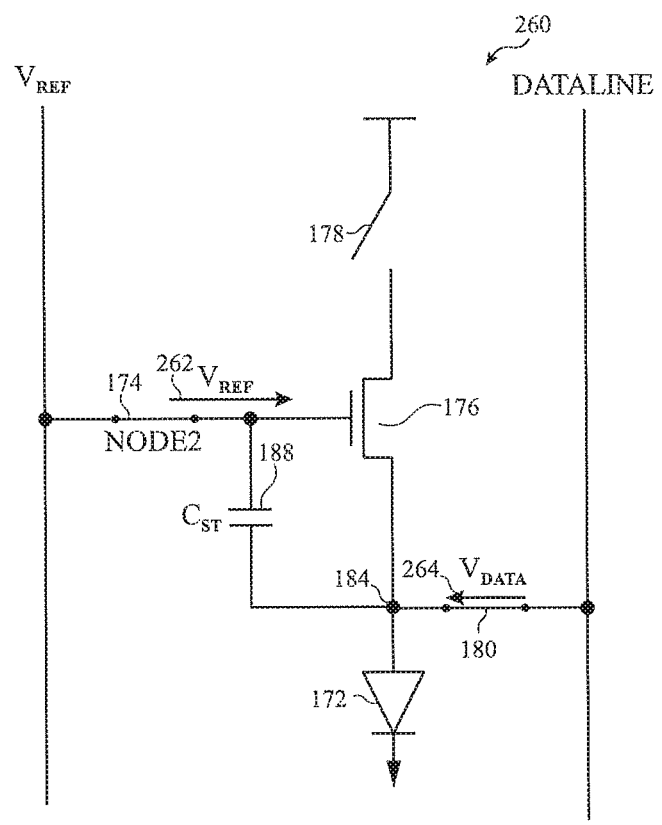
FIG. 18 is a schematic diagram of the pixel control circuitry of FIG. 12 in a data write phase, in accordance with an embodiment.
Figure 19:
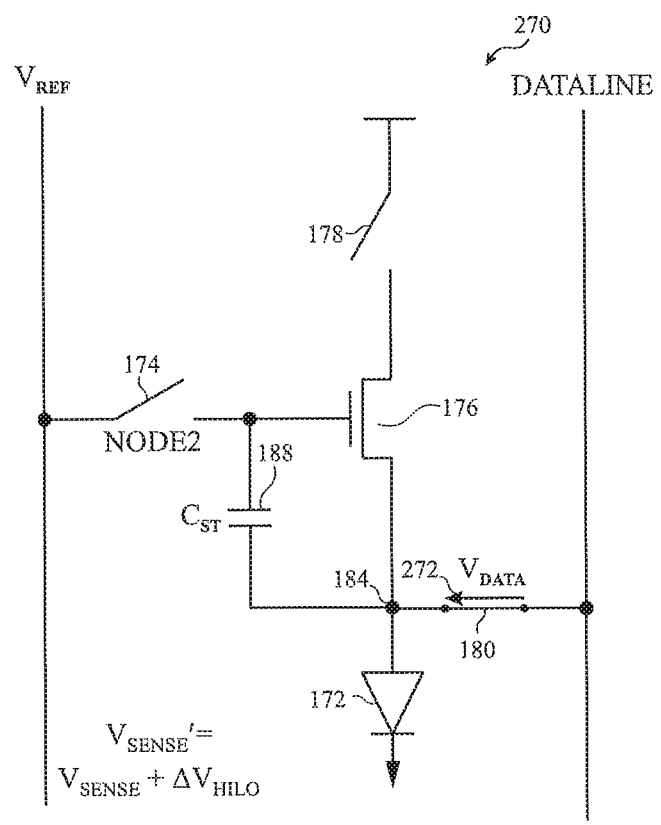
FIG. 19 is a schematic diagram of the pixel control circuitry of FIG. 12 in an sense injection voltage phase, in accordance with an embodiment.
Figure 20:
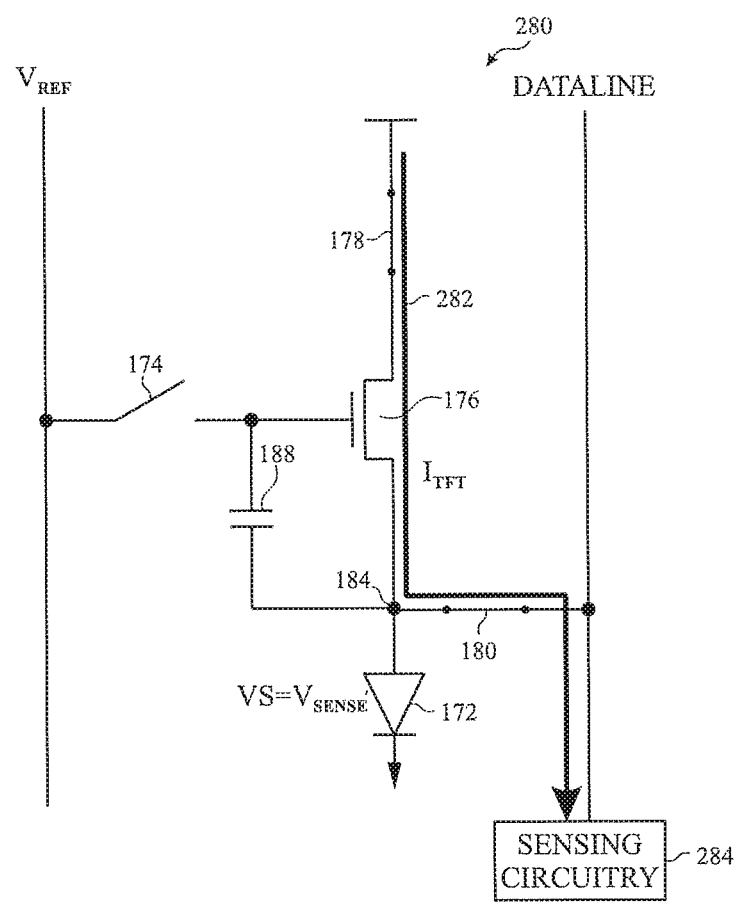
FIG. 20 is a schematic diagram of the pixel control circuitry of FIG. 12 in a sense phase, in accordance with an embodiment.

FIG. 17 illustrates an embodiment of an emission mode for the pixel control circuitry 170 in an emission state. In the emission state, an $I_{TFT}$ current 250 is passed through the OLED 172 to cause emission. To achieve a desired level, the $V_{ANODE}$ may be set to compensate for the $\Delta V_{HILO}$. To achieve this level, voltage at the ANODE may be set during the sensing phase of the display 18. FIGS. 18-20 illustrates compensating the $V_{ANODE}$ for $\Delta V_{HILO}$ due to temperature and/or other factors. FIG. 18 illustrates a loading step 260 the $C_{ST}$ 188 using $V_{REF}$ 262 and $V_{DATA}$ 264 via the closed switches 174 and 180. FIG. 19 illustrates an injection mode 270 that injects a $V_{SENSE}$ 272 that includes a $V_{SENSE}$ and a compensation for $\Delta V_{HILO}$. The $V_{SENSE}$ may be a static voltage level that is sufficiently high to determine whether a return current is as expected to determine health (e.g., age) and/or expected functionality of the corresponding pixel. FIG. 20 illustrates the return current $I_{TFT}$ 282 through the transistor 176 and closed switches 178 and 180 to sensing circuitry 284.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method comprising:
    at a processor, obtaining an indication of a temperature;
    using the processor, predicting a voltage change across an emissive element of a display based at least in part on the indication of the temperature; and
    compensating for the predicted voltage change prior to an emission state of the emissive element, wherein the compensating for the predicted voltage change comprises:
        an injection mode in which a voltage is applied to the emissive element, wherein the voltage is an inverse of the predicted voltage change; and
        a sensing mode, after the injection mode, in which a return current is sensed, wherein the return current indicates a functionality of the emissive element with temperature compensation using the applied voltage.

2. The method of claim 1, wherein obtaining the indication of the temperature comprises receiving a temperature measurement from a temperature sensor.

3. The method of claim 1, wherein obtaining the indication of the temperature comprises receiving a calculated temperature for a pixel, grid of pixels, or a panel of grids of pixels.

4. The method of claim 3, wherein the calculated temperature is based at least in part on a measured temperature from a temperature sensor.

5. The method of claim 4, wherein the calculated temperature comprises an interpolation based on a condition of an electronic device including the display.

6. The method of claim 1, wherein compensating for the predicted voltage change comprises using an enhanced sensing voltage during the sensing mode.

7. The method of claim 6, wherein the enhanced sensing voltage comprises a static sensing voltage plus an inversion of the predicted voltage change.

8. The method of claim 1, wherein predicting the voltage change comprises:
    deriving empirical data indicative of the voltage change corresponding to temperature changes;
    storing the empirical data in a lookup table; and
    looking up the predicted voltage change in the lookup table using the indication of the temperature.

9. The method of claim 8, wherein deriving empirical data indicative of the voltage change corresponding to temperature changes comprises:
    deriving multiple-pass empirical data for each pixel or grid; and
    averaging the multiple-pass empirical data to the empirical data to reduce possible noise in deriving the empirical data.

10. The method of claim 1, wherein predicting the voltage change comprises predicting the voltage change based at least in part on a grayscale level to be emitted by the emissive element.

11. The method of claim 10, wherein compensating for the predicted voltage comprises:
    applying a compensation voltage for a first set of grayscale levels; and not applying the compensation voltage for a second set of grayscale levels.

12. The method of claim 1, wherein predicting the voltage change comprises predicting the voltage change based at least in part on a color of the emissive element.

13. A system comprising:
a display panel comprising a plurality of pixels each comprising an emissive element;
a processor configured to:
  determine a voltage level to be used in an emission state for the emissive element;
  receive a correlation model that correlates temperature to a voltage shift across a corresponding emissive element;
  receive an indication of a temperature for the system;
  predict the voltage shift based at least in part on the indication of the temperature and the correlation model; and
  compensate the voltage level based on the predicted voltage shift, wherein the compensating the voltage level comprises:
    applying a voltage to the emissive element, wherein the voltage is an inverse of the predicted voltage shift; and
    sensing, after the voltage is applied to the emissive element, a return current indicating a functionality of the emissive element with temperature compensation using the applied voltage.

14. The system of claim 13, wherein the voltage shift is at least partially attributable to parasitic capacitance in the display panel.

15. The system of claim 13, comprising a temperature sensor, wherein the processor receives the indication of the temperature from the temperature sensor as a temperature measurement.

16. The system of claim 15, wherein the indication of the temperature comprises an overall system temperature for the system, and the correlation model correlates the overall system temperature to a temperature at a respective emissive element.

17. The system of claim 15, wherein a pixel of the plurality of pixels comprises sensing circuitry configured to sense the return current.

18. Non-transitory, computer-readable, and tangible medium storing instructions thereon that, when executed, are configured to cause a processor to:
receive an indication of a temperature of a display panel;
receive a grayscale level of an emissive element of the display panel;
predict a voltage shift at the emissive element based at least in part on the grayscale level and the indication of the temperature; and
compensate for the predicted voltage shift during a sensing phase for the emissive element, wherein compensating for the predicted voltage comprises:
  applying a voltage to the emissive element, wherein the voltage is an inverse of the predicted voltage shift; and
  sensing, after the voltage is applied to the emissive element, a return current indicating a functionality of the emissive element with temperature compensation using the applied voltage.

19. The non-transitory, computer-readable, and tangible medium of claim 18, wherein the instructions are configured to determine an emission color for the emissive element, and wherein predicting the voltage shift comprises predicting the voltage shift based at least in part on the emission color.

* * * * *